Oct. 10, 1967 R. DEAN, JR 3,346,082
POWER TRANSMISSION CONTROLS
Filed Sept. 15, 1965
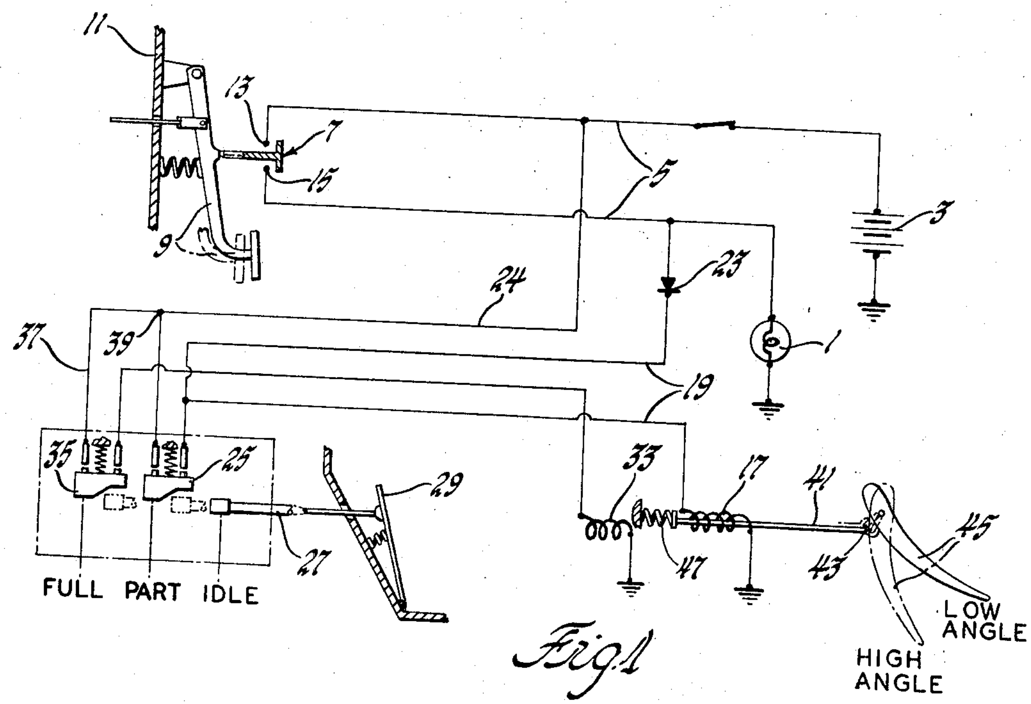
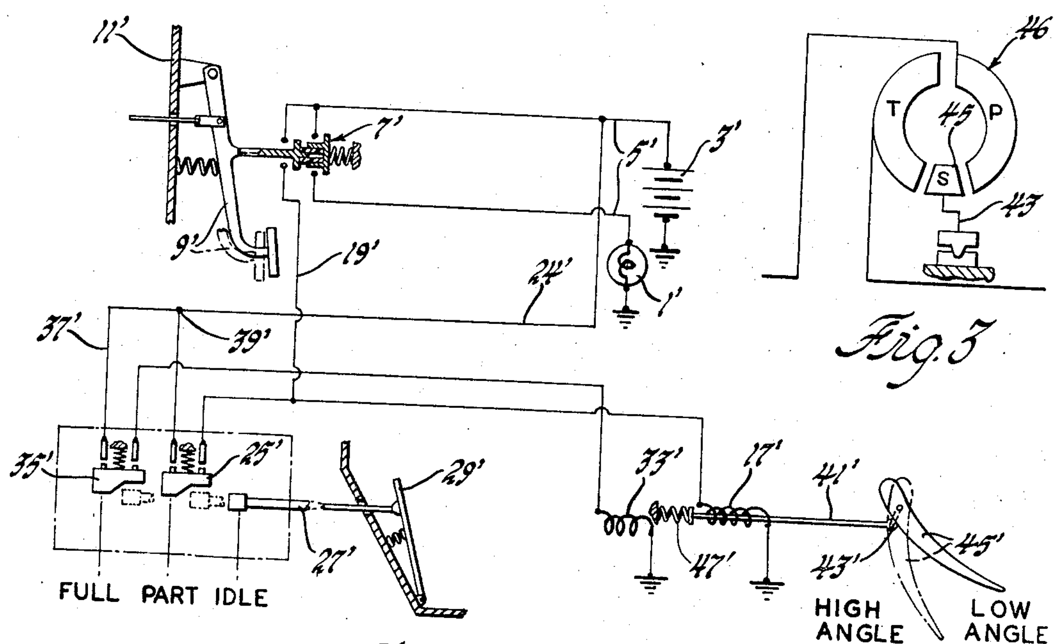
Fig. 2
INVENTOR.
Ralph Dean, Jr.
BY
A. M. Heiter
ATTORNEY 3,346,082

POWER TRANSMISSION CONTROLS

Ralph Dean, Jr., Fenton, Mich., assignor to General Motors Corporation, Detroit, Mich., a corporation of Delaware Filed Sept. 15, 1965, Ser. No. 487,519
12 Claims. (Cl. 192—4)

ABSTRACT OF THE DISCLOSURE

Controls for varying the pitch of the stator blades in the torque converter of a power transmission for a vehicle including a stator pitch control solenoid connected to a vehicle stop light circuit so that the solenoid is energized to switch the blades from low to high angle position to reduce converter torque absorption capacity when the vehicle brake pedal is depressed. The controls further include a circuit having a switch operated by a throttle pedal so that the solenoid is energized to switch the blades from low to high angle position for vehicle performance when the throttle pedal is positioned at high torque demand positions.

This invention relates to power transmission controls and more particularly to controls for torque converters which vary converter torque-absorption capacity and which are integrated into existing controls in the vehicle.

It has been the practice in recent power transmission design to incorporate a torque converter having variable pitch stator blades with means to turn the blades from low to high-angle positions on engine idle to reduce torque-absorption capacity of the converter pump and thereby reduce vehicle creep from stationary position. For normal vehicle cruising the stator blades are turned to a low blade angle for high efficient converter operation. For powerful acceleration, the stator blades are again turned to their high-angle position to permit higher engine input speeds in relation to converter turbine speed.

This invention is an improved control system for moving the converter variable pitch stator blades to their anti-creep position when vehicle brakes are applied in which the control for moving the stator blades is operatively coupled to controls for the vehicle stop lights. This invention provides for the simultaneous energization of the vehicle stop lights and an actuator for changing the pitch of the stator blades from low, to high angle in one condition of vehicle operation and for energization of this actuator alone to change the pitch of the stator blades from low to high angle without energization of the stop lights in another condition of vehicle operation.

An object of this invention is to provide a new and improved power transmission control integrated into existing vehicle controls.

Another object of this invention is to provide a new and improved control for reducing the torque absorption capacity of a torque converter in a torque converter transmission to reduce vehicle creep from a standing position.

Another object of this invention is to provide new and improved controls for varying the pitch of the stator blades of a torque converter and for simultaneous energization of a lighting circuit.

Another object of this invention is to provide a new and improved control for switching the pitch of the torque converter stator blades to a high angle, anti-creep position and to simultaneously energize a light circuit on operation of the vehicle brake actuator.

Another object of this invention is to provide a new and improved control for varying the pitch of the stator blades of a torque converter transmission integrated with controls for vehicle stop lights and in which the stator blades may be switched to high-angle position with energization of the vehicle stop lights in one phase of vehicle operation and without energization of the lights in another phase of vehicle operation.

These and other objects of the invention will become apparent from the following description and drawings in which:

FIGURE 1 is a schematic diagram illustrating a preferred embodiment of the invention, and FIGURE 2 is a schematic diagram of a second embodiment of the invention, and FIGURE 3 shows diagrammatically a hydrodynamic torque converter having variable pitch stator blades.

Referring now in particular to FIGURE 1, a grounded lamp 1 which may be a stop light in a vehicle is connected to grounded electric power source 3 by conductor 5. A switch 7 is disposed in the conductor between the source and the lamp and is coupled directly to the vehicle brake pedal 9, pivotally mounted to internal support structure 11. The switch when closed on initial brake application of the brake pedal contacts terminals 13 and 15 allowing energization of the lamp 1 by source 3. A grounded stator solenoid 17 is connected to the source in parallel with the lamp by conductor 19 so that, upon closure of the switch 7, the stator solenoid 17 will be energized as well as the lamp 1. A unidirectional conducting device, such as diode 23, is interposed in the conductor 19 and is poled in a direction to prevent reverse current flow from the source 3 through conductor 24 and switch 25, when closed to lamp 1.

Switch 25, connected in parallel with switch 7, is utilized to connect conductor 24 to the stator solenoid 17 and is adapted to be closed by the camming action of an extension 27 suitably fastened to vehicle torque demand control, such as accelerator pedal 29, to energize the stator solenoid without energization of the lamp 1.

A grounded downshift solenoid 33 is connected to source 3 and in parallel with lamp 1 and solenoid 17. This may be accomplished by coupling conductor 37 to hot line 24 at 39, a switch 35 having one terminal connected to conductor 37 and another terminal connected to a conductor leading from solenoid 33.

The solenoid, when energized by the source on the closing of switch 35 through the camming action of extension 27 at full throttle opening, retracts a fluid control plunger, not shown, that controls a detent valve, also not shown, which in turn provides a forced downshift as is well known in the art.

The stator control solenoid 17 has an armature 41 extending therefrom which is operatively connected to rotatable cranks 43 that have stator blades 45 secured thereto. On energization of solenoid 17 the cranks are turned by movement of armature 41 thereby turning the stator blades from their low angle, high capacity position to their high angle, low capacity position shown in phantom lines. The blades will be held in this position during operation of converter 46 until coil 17 is deenergized and then return spring 47 returns the armature 41 and the stator blades to their full line, high capacity position.

The stator blades of this invention may be turned to their high- and low-angle positions by means other than that shown. For example, the solenoids may be used to control the operation of a stator control valve which controls the supply of fluid to or the exhaust of fluid from one side of a hydraulic motor connected to the stator blade cranks. Examples of such motors and their connection to the stator blades may be found in U.S. Patents 2,932,939; 2,932,940; 2,995,955 and 2,999,400.

The FIG. 2 embodiment is somewhat similar to that of FIG. 1; however, the unidirectional conducting device is eliminated and a wiring connection is made between the stop light switch and the transmission switch-the-pitch solenoid. As shown, the grounded lamp 1' is connected to grounded source 3' by conductor 5' and solenoid 17' is connected to the source by conductor 19'. A multiple contact switch 7' is coupled to the vehicle brake pedal 9' pivotally supported in the vehicle similar to the FIG. 1 embodiment. This switch when closed on predetermined movement of the brake pedal enables the source 3' to energize both the lamp 1' and the stator solenoid 17' connected in parallel.

As shown, the stator solenoid 17' is also connected to the source through conductor 24' and switch 25' in parallel with lamp 1'. This switch is adapted to be closed at part throttle and through full throttle by the camming action of an extension 27' suitably fastened to vehicle accelerator pedal 29'. Closure of the switch 25' allows energization of the stator solenoid 17' without energization of the lamp 1' since switch 7' will not at this time be closed.

As in the FIG. 1 embodiment a grounded downshift solenoid 33' is connected to the source by switch 35' and conductor 37' which is joined to conductor 24' at junction 39'. Solenoid 33' is energized upon the closing of the switch 35' by the camming action of the extension 27' when the accelerator pedal 29' is moved to full-throttle position. This provides for forced downshift as in the FIG. 1 embodiment.

As shown, an armature 41' mounted in the solenoid 17' is moved longitudinally on energization of the solenoid 17'. The movement of armature 41' by the solenoid moves the attached stator blades 45' to high-angle, low-capacity position by virtue of its connection with crank 43' which pivotally mounts the blade to the stator. Suitable means, such as return spring 47', are utilized to return the armature 41' and the stator blades to their low-angle, high-capacity position when the solenoid 17' is not energized.

It will be seen that, upon operation of the brake pedal of either disclosed embodiment, both the stator solenoid and the lamp are energized. The energization of the stator solenoid will move the stator blade angle to the low-capacity position and reduce vehicle creep. It will be noted that the stator solenoid will be energized when the switch completes the circuit and is not particularly dependent upon the actual stopping of the vehicle. Thus, if the vehicle is standing and the engine is idling, a slight release of the blade pedal would not necessarily mean that the stator blades would be moved to their low-angle, high-capacity position.

At part throttle and thereafter through full throttle it will be seen that the switch 25 or 25' is closed by extension 27 or 27' to complete the connection between the stator solenoid and the source even though the brake pedal has not been depressed to close the associated switch. Although the stator solenoid is energized, current from the source will not flow to lamp 1 or 1' by virtue of the unidirectional conducting diode 23 of the FIG. 1 embodiment and the open switch 7' of the FIG. 2 embodiment. Thus the stop lamp would not be energized at part throttle or thereafter. At full throttle he swich 35 or 35' is moved by camming action of the accelerator pedal extension 27 or 27' so that the downshaft solenoid 33 or 33' is energized by the source. However, since the lamp is in no way connected to this latter-mentioned switch, it will not be energized.

It will be understood from the embodiments described above that this invention provides a new and improved control for varying the pitch of the stator blades in torque converter transmissions and the movement of the stator blades from their low to high-angle position will reduce the torque-transmitting capacity of the transmission thus reducing vehicle creep. When the engine is idling, it runs at a low torque level and this torque will not be increased by the movement of the stator blades. At part throttte and thereafter the stator blades are also turned to the high-angle position for performance. However, it will be appreciated that the engine is now performing at much higher torque levels and, although capacity is reduced, the higher torque produced will be transmitted by the torque converter transmission to increase vehicle performance.

Other embodiments and modifications to the disclosed embodiments may be readily made to those above and that which has been disclosed is only by way of example and not by limitation. It is to be appreciated that the invention is not to be limited by that which has been above shown and described but to the claims appended hereinafter.

I claim:

1. In a control for a torque converter having variable pitch rotor blades, a source of energy, first means energizable by said source, means energizable by said source for varying the pitch of said rotor blades, first and second actuator means, means responsive to operation of said first actuator means for operatively connecting first and second-mentioned means to said source, and means responsive to operation of said second actuator means for operatively coupling only said second-mentioned means to said source.

2. A control in a vehicle for varying the torque-absorption capacity of a torque converter in the vehicle power transmission, a vehicle brake actuator and a torque demand control, means responsive to application of said vehicle brake actuator for reducing converter capacity and to simultaneously indicate retardation of vehicle movement, and means responsive to application of said vehicle torque demand control for reducing converter capacity without indicating retardation of vehicle movement.

3. The control of claim 2 including a source of electrical energy and in which said first-mentioned means includes a solenoid and a lamp load, said solenoid and lamp load being connected in parallel and a unidirectional conducting device being interposed between said solenoid and said source to permit current to flow only from said source to said solenoid in one condition of control operation.

4. The control of claim 2 including a source of electrical energy and in which said first-mentioned means includes a solenoid and a lamp load, said solenoid and said lamp load being connected in parallel, and means connecting said source to said lamp and said solenoid, said last-mentioned means including a multiple-contact switch.

5. In a control for a transmission, a torque converter having means for varying the torque-absorption capacity of said torque converter, a source of electrical energy, energizable means, means including a switch connecting said source to said energizable means, electrically-controlled actuator means for varying the capacity of said torque converter disposed in parallel to the load of said energizable means, unidirectional conducting means disposed between said actuator means and said source and connected in parallel with said energizable means, and switch means connected in parallel with said energizable means for connecting only said electrically-controlled actuator means to said source.

6. In a control for a transmission, a torque converter having means for varying the torque-absorption capacity of said torque converter, a source of electrical energy, a lamp, means including a switch connecting said source to said lamp, electrically-operated actuator means for varying the capacity of said torque converter disposed in parallel to said lamp load, unidirectional conducting means disposed between said actuator means and said source and connected in parallel with said lamp, and second switch means for said actuator means connected in parallel with said signal means.

7. In a control for varying the capacity of a torque converter transmission, a source of electrical energy, indicator means adapted to be energized by said source, switch means disposed between said source and said indicator mean allowing said source to energize said indicator means when closed, operator means in parallel with said indicator means energizable by said source for varying the capacity of said transmission, switch means between said source and said operator means for allowing said source to energize said operator means when said first switch means is open, and unidirectional means disposed between said indicator means and said operator means blocking flow of electrical energy to said indicator means from said second-mentioned switch means.

8. In a control for varying the capacity of a torque converter transmission, a source of electrical energy, indicator means adapted to be energized by said source, switch means disposed between said source and said indicator means for allowing said source to energize said indicator means when closed, operator means in parallel with said indicator means energizable by said source for reducing the capacity of said transmission, switch means between said source and said operator means, means for energizing said operator means when said first switch means is open, and unidirectional means disposed between said indicator means and said operator means preventing flow to said indicator means from said second switch means.

9. In a control for varying the capacity of a torque converter transmission, a source of electrical energy, indicator means energizable by said source, switch means disposed between said source and said indicator means allowing said source to energize said indicator means when closed, operator means in parallel with said indicator means and energizable by said source to vary the capacity of said transmission, second switch means between said source and said operator means to allow said source to energize said operator means, said switch means being simultaneously operable by an actuator member, and third switch means connecting said operator means to said source to allow said source to energize said operator means without energization of said indicator means.

10. In a vehicle having vehicle braking means, torque demand control means and a control for varying the capacity of a torque converter transmission, a source of electrical energy, lamp means, conductor means connecting said lamp to said source, switch means disposed in the conductor means between said source and said indicator means allowing said source to energize said indicator means when closed, vehicle brake operator means for opening and closing said switch means and for braking the vehicle, second conductor means, solenoid means connected in parallel by said second conductor with said indicator means and energizable by said source, a diode interposed in said second conductor means to permit electric energy to flow only in one direction and to said solenoid, torque converter variable pitch rotor blade means operatively connected to said solenoid means for varying the capacity of said transmission on change in pitch of said rotor blade means, third conductor means connecting said solenoid means in parallel with said lamp means and bypassing said switch means, a second switch means interposed in said conductor means and operable by said torque demand control means to allow said source to energize said solenoid means without energization of said stop lamp means, and said third conductor means being connected to said solenoid means between said solenoid means and said diode.

11. The device of claim 10 wherein a second solenoid is operatively connected in parallel to said lamp and said first solenoid and is energizable by said source, and third switch means operable by said torque demand control means to permit said source to energize said second solenoid without energizing said lamp.

12. In a vehicle having vehicle braking means, torque demand control means and a control for varying the capacity of a torque converter transmission, a source of electrical energy, lamp means, conductor means connecting said lamp to said source, switch means disposed in the conductor means between said source and said indicator means allowing said source to energize said indicator means when closed, vehicle brake operator means for opening and closing said switch means and for braking the vehicle, second conductor means, solenoid means connected in parallel by said second conductor with said indicator means and energizable by said source on closure of said switch means, torque converter variable pitch rotor blade means operatively connected to said solenoid means for varying the capacity of said transmission on change in pitch of said stator blade means, third conductor means connecting said solenoid means in parallel with said lamp means and by-passing said switch means, a second switch means interposed in said conductor means and operable by the vehicle torque demand control means to allow said source to energize said solenoid means without energization of said stop lamp means, and said third conductor means being connected to said solenoid means between said solenoid means and said first switch means.

References Cited

UNITED STATES PATENTS

| | | | |
|---|---|---|---|
| 2,409,541 | 10/1946 | Carnagua | 192—3 |
| 2,836,736 | 5/1958 | Johnson | 307—155 |
| 2,999,950 | 9/1961 | Johnson | 307—155 |
| 3,042,162 | 7/1962 | Hause | 192—4 |
| 3,119,478 | 1/1964 | Ritter | 192—4 |
| 3,180,999 | 4/1965 | Kendall | 307—41 |

MARK NEWMAN, *Primary Examiner.*

A. T. McKEON, *Assistant Examiner.*

UNITED STATES PATENT OFFICE

CERTIFICATE OF CORRECTION

Patent No. 3,346,082 October 10, 1967

Ralph Dean, Jr.

It is hereby certified that error appears in the above numbered patent requiring correction and that the said Letters Patent should read as corrected below.

Column 3, line 49, for "blade" read -- brake --; line 62, for "he" read -- the --; same line 62, for "swich" read -- switch --; line 64, for "downshaft" read -- downshift --; column 6, line 52, for "Kendall" read -- KuyKendall --.

Signed and sealed this 22nd day of October 1968.

(SEAL)
Attest:

Edward M. Fletcher, Jr.
Attesting Officer

EDWARD J. BRENNER
Commissioner of Patents